Nov. 29, 1966   J. P. SOLTAU   3,287,900
COMBUSTION APPARATUS FOR ENGINE EXHAUST GAS
Filed Nov. 23, 1965   3 Sheets-Sheet 3

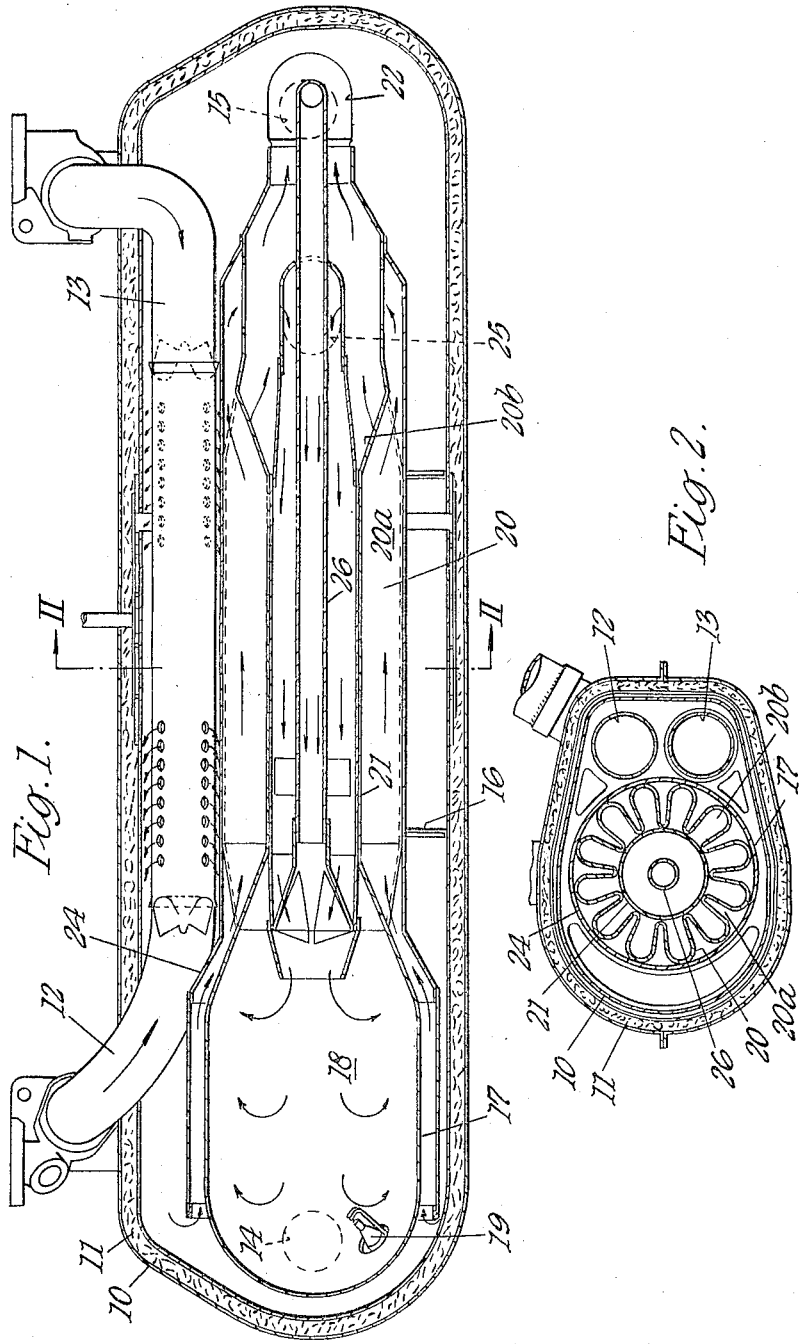

United States Patent Office 3,287,900
Patented Nov. 29, 1966

3,287,900
COMBUSTION APPARATUS FOR ENGINE EXHAUST GAS
John Peter Soltau, Dorridge, Solihull, England, assignor to Joseph Lucas (Industries) Limited, Birmingham, England, a British company
Filed Nov. 23, 1965, Ser. No. 509,322
1 Claim. (Cl. 60—30)

This invention relates to combustion apparatus of the kind in which there is defined a combustion chamber for burning exhaust gases from a multi-cylinder internal combustion engine to reduce the quantities of noxious substances exhausted into the atmosphere.

The object of the invention is to provide apparatus of the kind specified in a convenient form.

According to the present invention combustion apparatus comprises an outer casing, an inner casing, a plurality of equal length inlet pipes for exhaust gas from a multi-cylinder internal combustion engine, the discharge ends of said inlet pipes being disposed in a space defined between the inner and outer casings. Said inner casing defining a combustion chamber, an inner tube combustion air delivery means arranged to discharge into said inner tube, an inner tube communicating at one of its ends with the combustion chamber, first passage forming means communicating at one end with the space between the inner and outer casings and at the other end with said inner tube, and second passage forming means alternating with said first passage forming means, said second passage forming means affording communication between the combustion chamber and an outlet for the products of combustion.

Examples of the invention will now be described with reference to the accompanying drawings in which:

FIGURE 1 is a cross-sectional side elevation view of combustion apparatus constructed in accordance with this invention, FIGURE 2 is a cross-sectional view on the line II—II in FIGURE 1.

Figure 3:
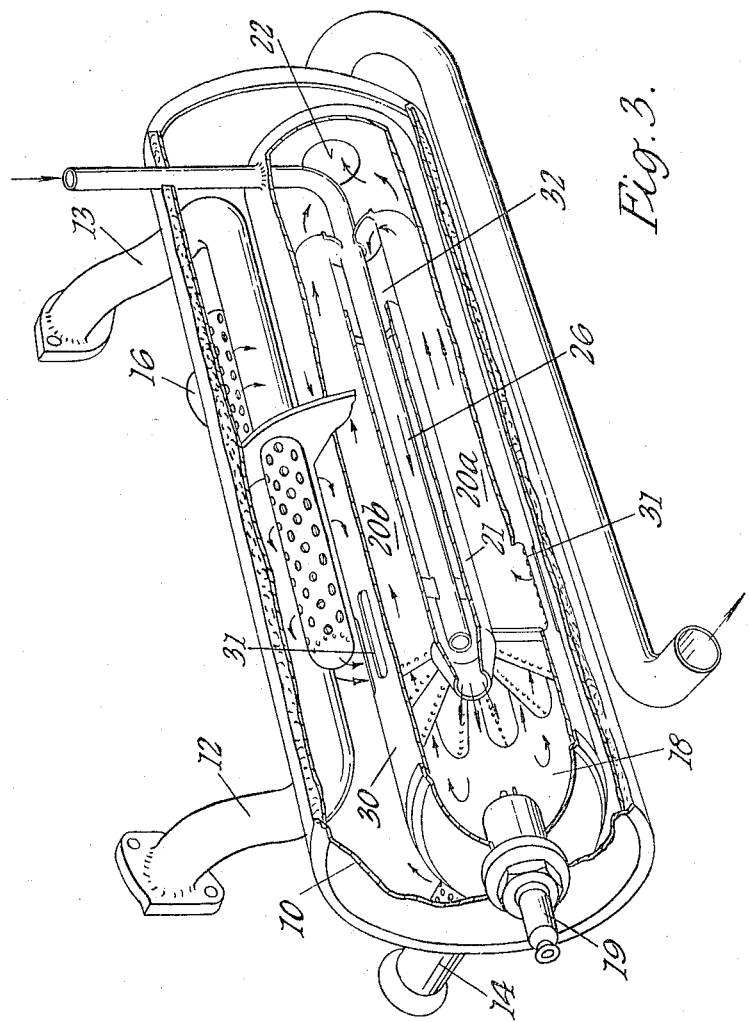
FIGURE 3 is a partially cut away perspective view of an alternative construction and FIGURE 4 is a similar view to FIGURE 3 of a further alternative construction.

The examples of the invention shown in the drawings are specifically intended for use with motor vehicle internal combustion engines of the kind having four cylinders arranged in two mutually opposed pairs. Such apparatus is intended to take the place of a silencer and expansion chamber normally incorporated in the exhaust system of such an engine.

In the example shown in FIGURES 1 and 2 the apparatus comprises a closed ended generally cylindrical outer casing 10 which has an external lining 11 of material having heat and sound insulating properties.

Through the wall of the outer casing 10 four separate inlet pipes 12, 13, 14, 15 two of which 12, 14 pass through the wall near one end of the outer casing 10 and the remaining two 13, 15 pass through near the opposite end. The inlet pipes 12 and 13 have relatively short lengths outside the outer casing and their discharge end portions are perforated as illustrated in FIGURE 1 and these two pipes 12, 13 overlap. The inlet pipes 14, 15 however terminate at their discharge ends adjacent to portion of the wall of the outer casing 10 through which they pass. The four linet pipes, including these parts thereof outside the outer casing 10, are of equal length. The discharge ends of the inlet pipes 14, 15 are also perforated this arrangement ensuring that gas flows from them into the interior of the outer casing in several directions, this arrangement tending to break up continuous flow paths of the gases.

Supported by suitably positioned webs 16 within the outer casing 10 near one end spaced from its wall is an inner casing 17 defining a combustion chamber 18. The end of this inner casing near the adjacent end of the outer casing 10 is approximately hemispherical and incorporates ignition initiating and/or sustaining means 19 in any convenient form, such as an electrical spark plug.

Extending from the open end of the combustion chamber 18 towards the opposite end of the outer casing 10 is a longitudinally corrugated plate 20 defining two sets of alternating passages arranged in an annular row within which is an inner tube 21.

The first set of alternating passages 20a afford communication between one end of the inner tube 21 and the space defined between the outer and inner casing 10 and 17. To enclose the exterior boundaries of the first set of passages 20a there is a member 24 which affords entry for gases around the inner casing 17.

The second set of alternating passages 20b afford communication between the combustion chamber 18 and an outlet pipe 22 for the discharge of the products of combustion from the apparatus, this outlet pipe 22 terminating near the end of the outer casing, 10 remote from the combustion chamber and if required, an additional external length of pipe (not shown) may be joined to this outlet pipe 22. One end of the inner tube 21 communicates with the passages 20a through transverse ports 25 and the opposite end of the inner tube 21 terminates in the combustion chamber 18.

Disposed within the inner tube 21 is a pipe 26 for supplying additional air for combustion to the combustion chamber 18 the opposite or outer end (not shown) of this pipe 26 terminating outside the outer casing 10.

Thus, in use, the gas leaving the engine enters the outer casing 10 through the outlet pipes 12, 13, 14 from whence it flows along the first set of alternating passages 20a to the inner tube 21. It then enters the combustion chamber 18, having been mixed with the additional air. The products of combustion then flow out of the combustion chamber 18 along the second set of alternating passages 20b, thus heating the gases flowing along the passages 20a and finally the gases are discharged through the outlet pipe 22.

Figure 4:
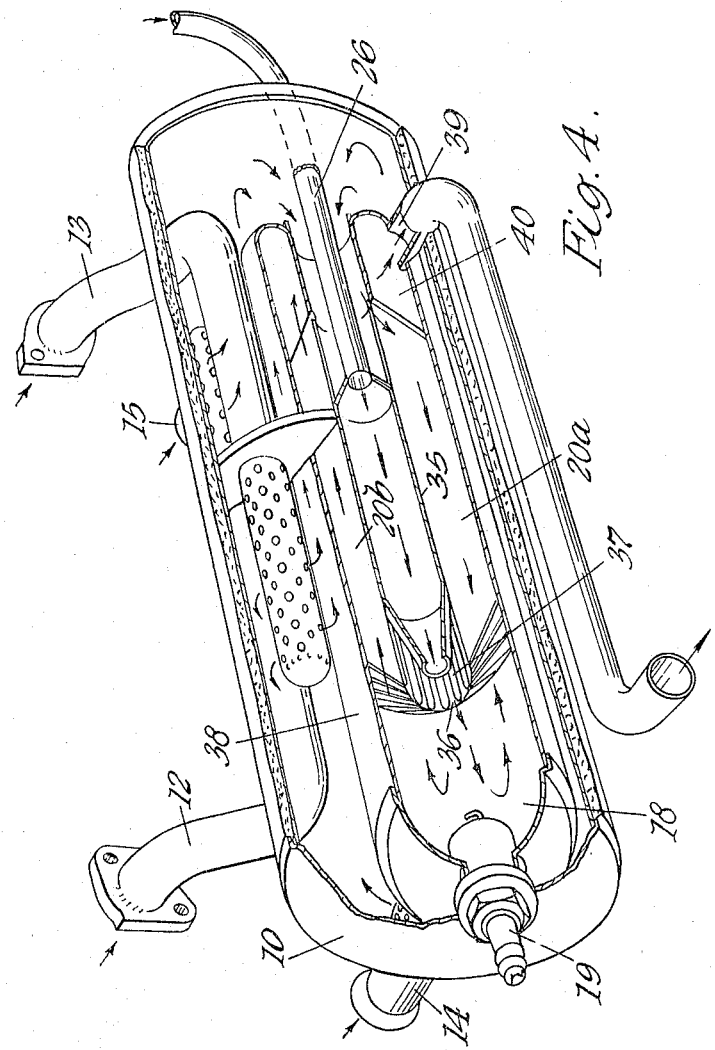

The construction shown in FIGURES 3 and 4 have the same numerals for corresponding parts of the apparatus shown in FIGURES 1 and 2.

The construction shown in FIGURE 3 the inner casing 30 extends throughout the length of the outer casing 10 and there are openings 31 affording communication between the first set of alternating passages 20a and the space defined between the inner and outer casings. Transverse ports 32 at the opposite ends of the passages 20a serve to deflect the gases into the inner tube 21. The passages 20a and 20b are furthermore formed by a plurality of separate parts secured together to define the passages as shown.

The construction shown in FIGURE 4 is similar to that of FIGURE 3 except that the inner tube is formed from a tubular part 35 communicating with the pipe 26 for supplying combustion air and also from a sleeve 36 in which slots 37 are formed, these slots 37 communicating with respective ones of the passages 20a. The passages 20a communicate at their other ends with a space surrounding the pipe 26, this space itself being open to the space defined between the inner casing 38 and the outer casing 10. The products of combustion leave the apparatus through an outlet pipe 39 extending transversely of the apparatus from an annular chamber 40 defined within the inner casing 38. This arrangement affords some heating of the combustion air by close proximity of the passages 20b for the products of combustion and the tubular part 35 through which this air flows.

Having thus described my invention what I claim as new and desire to secure by Letters Patent is:

Combustion apparatus comprising an outer casing and inner casing, a plurality of equal length inlet pipes for exhaust gas from a multi-cylinder internal combustion engine, the discharge ends of said inlet pipes being disposed in a space defined between the inner and outer casings, said inner casing defining a combustion chamber, an inner tube combustion air delivery means arranged to discharge into said inner tube, an inner tube communicating at one of its ends with the combustion chamber, first passage forming means communicating at one end with the space between the inner and outer casings and at the other end with said inner tube, and second passage forming means alternating with said first passage forming means, said second passage forming means affording communication between the combustion chamber and an outlet for the products of combustion.

References Cited by the Examiner
UNITED STATES PATENTS 3,210,161   10/1965   Soltau _____ 60—30 X MARK NEWMAN, *Primary Examiner.*

RALPH D. BLAKESLEE, *Assistant Examiner.*